(12) United States Patent
Zhang

(10) Patent No.: US 10,724,851 B2
(45) Date of Patent: *Jul. 28, 2020

(54) FUNCTIONAL ASSEMBLY, DISPLAY DEVICE AND TERMINAL

(71) Applicant: GUANGDONG OPPO MOBILE TELECOMMUNICATIONS CORP., LTD., Dongguan (CN)

(72) Inventor: Haiping Zhang, Dongguan (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 280 days.

This patent is subject to a terminal disclaimer.

(21) Appl. No.: 15/798,878

(22) Filed: Oct. 31, 2017

(65) Prior Publication Data

US 2018/0259321 A1 Sep. 13, 2018

(30) Foreign Application Priority Data

Mar. 7, 2017 (CN) .......................... 2017 1 0132077

(51) Int. Cl.
G01B 11/14 (2006.01)
G06F 1/16 (2006.01)
G01C 11/02 (2006.01)

(52) U.S. Cl.
CPC .............. *G01B 11/14* (2013.01); *G01C 11/02* (2013.01); *G06F 1/1686* (2013.01)

(58) Field of Classification Search
None
See application file for complete search history.

(56) References Cited

U.S. PATENT DOCUMENTS 9,435,910 B2 9/2016 Hsu
2011/0019073 A1* 1/2011 Naimark ................ H04N 5/232
348/370

(Continued)

FOREIGN PATENT DOCUMENTS

CN 202551132 U 11/2012
CN 103220417 A 7/2013

(Continued)

OTHER PUBLICATIONS

European Patent Application No. 17196646.8 extended Search and Opinion dated Apr. 20, 2018, 7 pages.

(Continued)

*Primary Examiner* — William C Vaughn, Jr.
*Assistant Examiner* — Joseph Daniel A Towe
(74) *Attorney, Agent, or Firm* — Lathrop GPM LLP

(57) ABSTRACT

Embodiments of the present disclosure provide a functional assembly, a display device and a terminal. The functional assembly includes a sensor unit, a first light-guiding component and a camera. The sensor unit includes an emitter and a receiver. The emitter is configured to emit probe light. The first light-guiding component is configured to introduce the probe light and transmit the probe light to the outside through the camera. The receiver is configured to receive detection light through the camera, the detection light being formed by reflection of the probe light against an obstacle. The functional assembly, the display device and the terminal in the present embodiment increase an area of a display region effectively, hence realizing an effect of large-screen display.

20 Claims, 7 Drawing Sheets

(56) References Cited

U.S. PATENT DOCUMENTS

| | | | |
|---|---|---|---|
| 2012/0037794 A1* | 2/2012 | Lee | G01S 17/04 250/216 |
| 2012/0129580 A1 | 5/2012 | Tam | |
| 2013/0208169 A1 | 8/2013 | Hegde | |
| 2015/0334859 A1 | 11/2015 | Lee et al. | |
| 2016/0377762 A1 | 12/2016 | Uedaira | |

FOREIGN PATENT DOCUMENTS

| | | |
|---|---|---|
| CN | 106453725 A | 2/2017 |
| CN | 106941541 A | 7/2017 |
| KR | 20160149556 A | 12/2016 |
| TW | I282508 B | 6/2007 |
| TW | 201619576 A | 6/2016 |

OTHER PUBLICATIONS

Taiwan Patent Application No. 10720306390 Office Action dated Apr. 13, 2018, 5 pages.
PCT/CN2017/105896, English translation of the International Search Report and Written Opinion dated Jan. 3, 2018, 13 pages.
U.S. Appl. No. 16/198,420, Office Action dated Apr. 5, 2019, 18 pages.

\* cited by examiner

FUNCTIONAL ASSEMBLY, DISPLAY DEVICE AND TERMINAL

CROSS-REFERENCE TO RELATED APPLICATIONS

The application claims priority to and benefits of Chinese Patent Application Serial No. 201710132077.8, filed with the State Intellectual Property Office of P. R. china on Mar. 7, 2017, the entire content of which is incorporated herein by reference.

FIELD

The present disclosure relates to a field of communication technology, and especially to a functional assembly, a display device and a terminal.

BACKGROUND

With continuous development of the terminal, in order to increase an area of a display region, a screen size of the terminal is enlarged continuously.

The terminal is usually provided with a display region, and the display region has a display function such as displaying images and characters. In addition, the terminal is further provided with a non-display region, and the non-display region is mainly used to realize other functions except the display function, such as a photographing function or a user recognition function. As the non-display region exists in the display screen, further enlargement of the area of the display region is limited. Thus, the enlargement of the area of the display region becomes a research hotspot in the field of terminals.

SUMMARY

The embodiments of the present disclosure provide the functional assembly, including: a sensor unit, a first light-guiding component and a camera. The sensor unit includes an emitter and a receiver. The emitter is configured to emit probe light. The first light-guiding component is configured to introduce the probe light and transmit the probe light to the outside through the camera. The receiver is configured to receive detection light through the camera, the detection light being formed by reflection of the probe light against an obstacle.

The embodiments of the present disclosure provide the display device, including a display screen and the above-mentioned functional assembly. The display screen includes a functional area, and the camera is provided in the functional area.

The embodiments of the present disclosure provide the terminal, including a circuit board, the above functional assembly and a casing. The circuit board is mounted in the casing and the functional assembly is connected to the circuit board.

BRIEF DESCRIPTION OF THE DRAWINGS

In order to elaborate technical solutions in embodiments of the present disclosure more clearly, drawings used in descriptions of the embodiments will be illustrated in the following. Obviously, the drawings to be illustrated in the following only represent some embodiments of the present disclosure, and other drawings can be obtained according to these drawings by those having ordinary skills in the related art without making creative efforts.

For a more complete understanding of the present disclosure and its advantages, the following description will be made with reference to the accompanying drawings, in which like reference numerals represent like parts.

DETAILED DESCRIPTION

Figure 1:
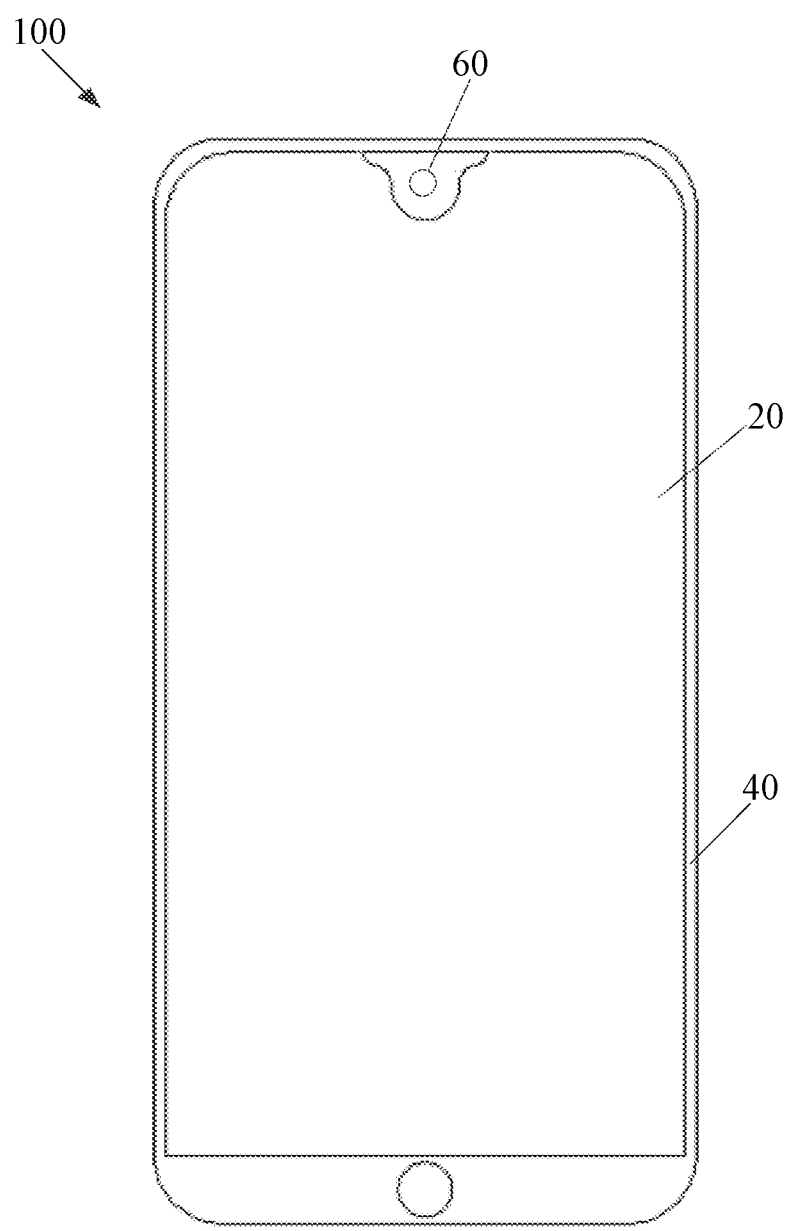
FIG. 1 is a first front elevation view of a terminal provided in embodiments of the present disclosure.

Before proceeding to the DETAILED DESCRIPTION below, it can be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, can mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, and such a device can be implemented in hardware, firmware or software, or some combinations of at least two thereof. It should be noted that the functionality associated with any particular controller can be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

The technical solutions in the embodiments of the present disclosure will be described clearly and completely in conjunction with the accompanying drawings in embodiments of the present disclosure. Apparently, the described embodiments are only a part of the embodiments of the present disclosure instead of all of the embodiments. All of the other embodiments obtained by those skilled in the related art without creative efforts, based on the embodiments in the present disclosure, belong to the protection scope of the present disclosure.

Terms "first", "second", "third" and the like (if existing) in the specification, the claims, and the accompanying drawings are used to distinguish similar objects instead of describing a specific sequence or a precedence order. It should be understood that the described objects can be exchanged in any suitable situations. In addition, terms "include" and "have" and any variations thereof intend to cover nonexclusive inclusions.

FIGS. 1 through 12, discussed below, and the various embodiments used to describe the principles of the present disclosure in this patent document are by way of illustration only and should not be construed to limit the scope of the disclosure. Those skilled in the art will understand that the principles of the present disclosure can be implemented in any suitably arranged device. The exemplary embodiments will be described in detail and examples of these embodiments are illustrated in the accompanying drawings. In addition, a terminal according to exemplary embodiments will be described in detail with reference to the accompanying drawings. Like reference numerals in the drawings denote like elements.

While such terms as "first," "second," and the like can be used to describe various components, such components must not be limited to the above terms. The above terms are used only to distinguish one component from another. For example, a first element could be termed a second element, and, similarly, a second element could be termed a first element, without departing from the scope of exemplary embodiments. As used herein, the term "and/or" includes any and all combinations of one or more of the relevant items listed.

The terms used in the present specification are merely used to describe particular embodiments, and are not intended to limit the inventive concept. An expression used in the singular form encompasses the expression in the plural form, unless it has a clearly different meaning in the context. In the present specification, it is to be understood that the terms such as "including," "having," and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof can exist or can be added. Like reference numerals in the drawings denote like elements.

Figure 2:
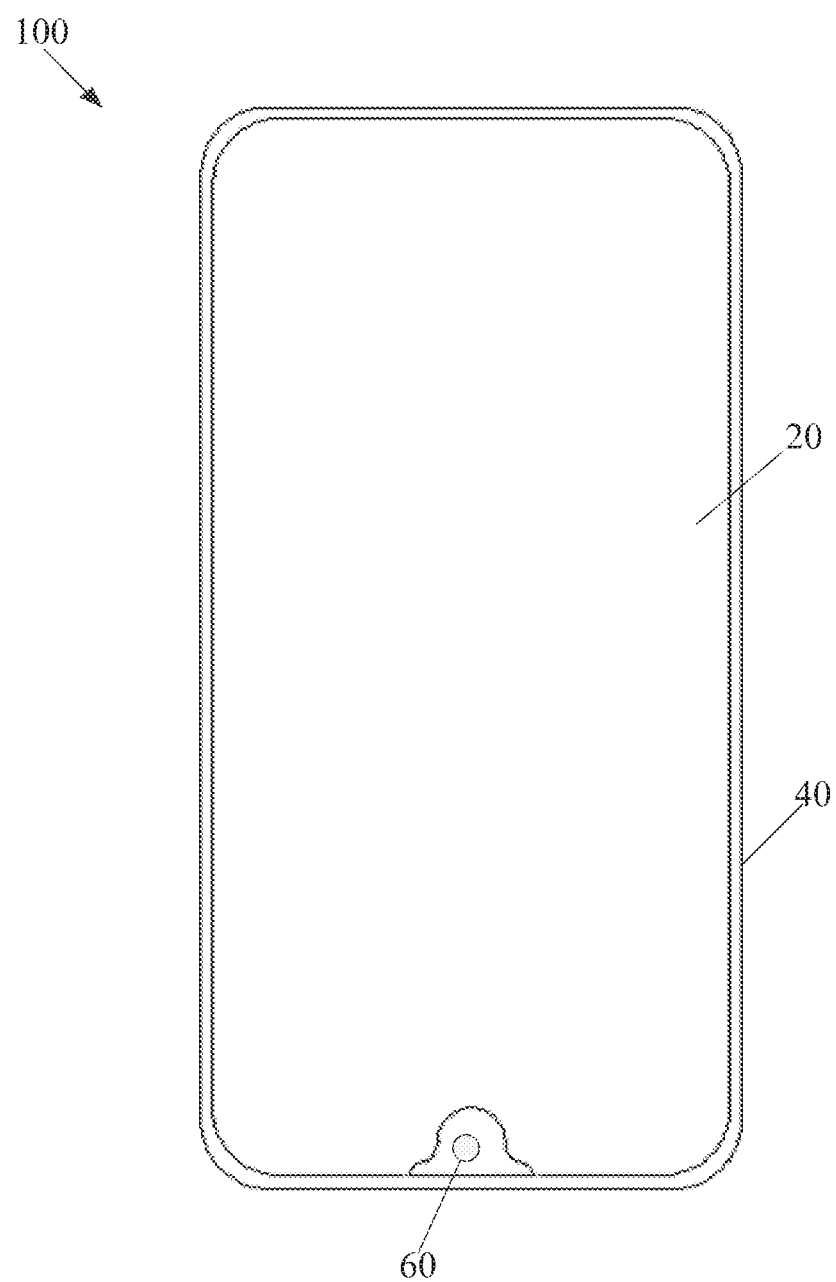
FIG. 2 is a second front elevation view of a terminal provided in embodiments of the present disclosure.

FIG. 1 illustrates a front elevation view of a terminal 100 according to an exemplary embodiment of the present disclosure. FIG. 2 illustrates a front elevation view of a terminal 100 according to another illustrative embodiment of the present disclosure. FIG. 1 and FIG. 2 illustrate smart phones as embodiments of the terminal 100. However, any terminal including a display screen 20, such as a tablet PC, a notebook PC and a PDA can also be used as the embodiments.

As FIG. 1 illustrated, the terminal 100 according to the illustrative embodiment includes the display screen 20, a functional assembly 60 and a casing 40. The display screen 20 and the functional assembly 60 can be accommodated in the casing 40.

The display screen 20 is configured to display electronic files. The display screen 20 can display information such as image, video, and text. The display screen 20 can include a front surface for displaying information and a rear surface located at an opposite side of the front surface.

The functional assembly 60 can be a unit which performs other functions rather than perform the display function. For example, the functional assembly 60 includes a sensor unit configured to emit signals and receive signals from the outside, a first light-guiding component, and a camera configured to collect an external image signal. Embodiments of the sensor unit can include a camera unit, a fingerprint sensor, a proximity sensor and an infrared sensor.

In some embodiments, as illustrated in FIG. 1, the functional assembly 60 can be provided to a top of the terminal 100 to face forwards. In some embodiments, as illustrated in FIG. 2, the functional assembly 60 can be provided to a bottom of the terminal 100 to face forwards.

In some embodiments, at least a part of the functional assembly 60 can be inserted into the display screen 20 and a member provided to a rear side of the display screen 20. In such a way, although the terminal 100 includes the functional assembly 60, it is not required to provide a non-display region separately for the display screen 20 in order to realize the functions of the functional assembly 60, such that a proportion of the display region in the display screen 20 can be increased, hence realizing an effect of large-screen display. The term "front" used herein refers to a direction that a side of the display screen 20 for displaying information faces, and the term "rear" refers to a direction opposite to "front".

The casing 40 can include a single member or a plurality of members which can be assembled. The casing 40 can include at least one of a plastic material, a ceramic material, and a metal material.

In the terminal 100 according to an embodiment, at least a part of the functional assembly 60 can be inserted into the display screen 20 and the member provided to the rear side of the display screen 20.

Figure 3:
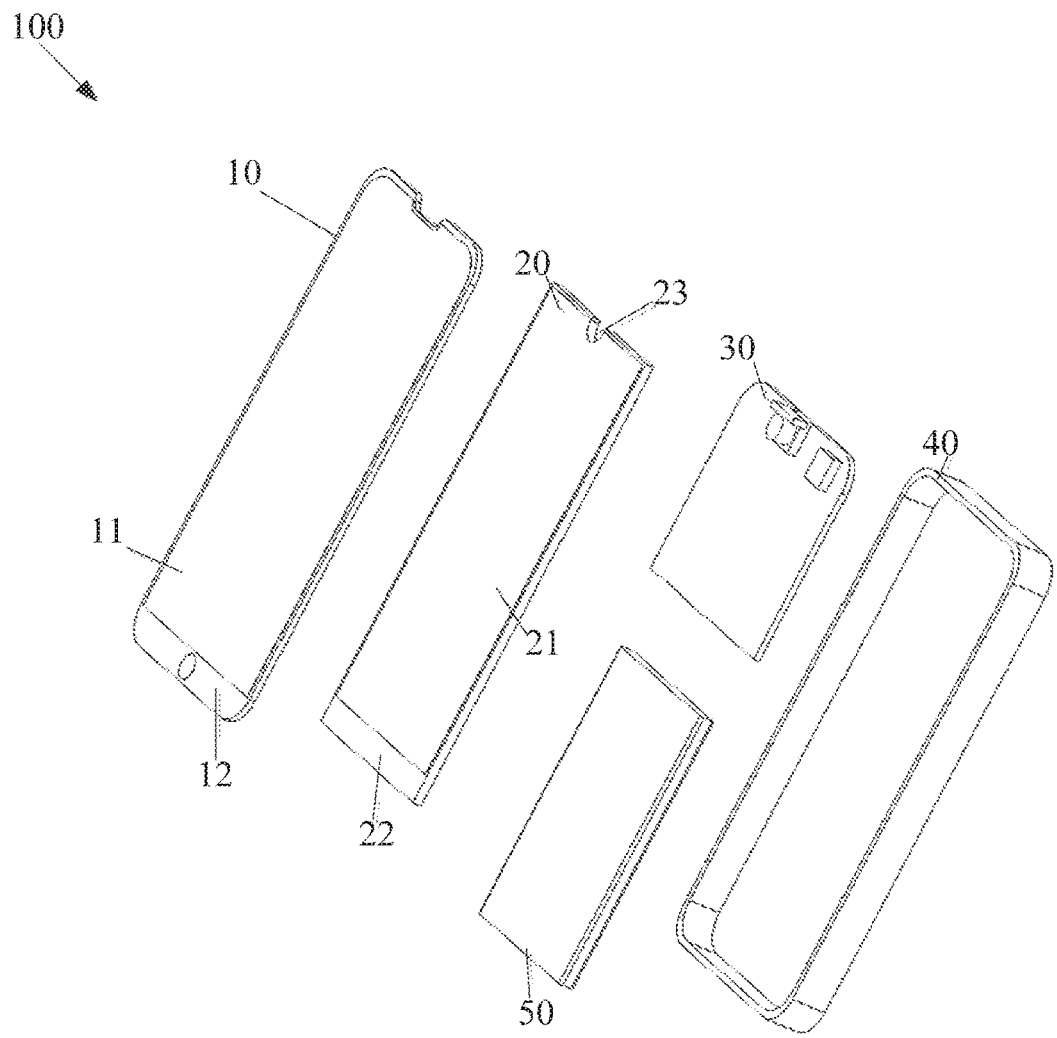
FIG. 3 is an exploded view of a terminal provided in embodiments of the present disclosure.

FIG. 3 illustrates an exploded view of the terminal 100.

As illustrated in FIG. 3, the terminal 100 can include a cover plate 10, the display screen 20, a printed circuit board 30 and the casing 40. The terminal 100 can further include a battery 50. The display screen 20 can be electrically connected to the printed circuit board 30 via a flexible printed circuit.

The cover plate 10 can be provided in front of the display screen 20. The cover plate 10 can protect the front surface of the display screen 20 and expose information displayed on the display screen 20 to the outside.

The cover plate 10 can include an exposing area 11 for exposing the information displayed by the display screen 20, and a non-exposing area 12 for blocking external visibility. The non-exposing area 12 can include a light-shielding layer, such as a black underlay, so that the interior of the terminal 100 is invisible. In some embodiments, the light-shielding layer is an ink layer.

The display screen 20 can include a display region 21 configured to display information and a non-display region 22 that does not display information. The display region 21 can serve as a main display region of the display screen 20 to display most of the information. The non-display region 22 can be provided outside the display region 21. The non-display region 22 can be provided with an IC (integrated circuit), and the IC is configured to control the information display of the display screen 20.

The non-exposing area 12 of the cover plate 10 can be provided in front of the non-display region 22 of the display screen 20, so as to hide the non-display region 22 of the display screen 20 from view.

The display screen 20 can include a functional area 23, and at least a part of the functional assembly 60 can be inserted into the functional area 23. The functional area 23 can be shaped as a hole, but the embodiments are not limited to this. The shape of the functional area 23 can also be a circular arc, a rounded rectangle, a rounded square or the like.

The functional area 23 can be formed in the display region 21 of the display screen 20.

The position of the functional area 23 can be varied according to the function performed by the functional assembly 60 and the position of the functional assembly 60.

Figure 4:
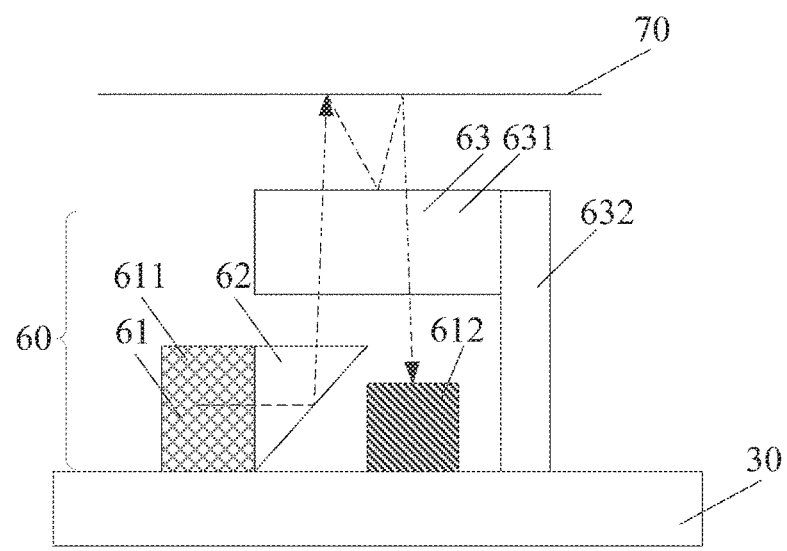
FIG. 4 is a first schematic view of a functional assembly provided in embodiments of the present disclosure.

As illustrated in FIG. 4, the functional assembly 60 is connected to the circuit board 30. The functional assembly 60 includes a sensor unit 61, a first light-guiding component 62 and a camera 63. In an embodiment, the sensor unit 61 is not a two-in-one device, and the sensor unit 61 includes an emitter 611 and a receiver 612.

The emitter 611 is configured to emit probe light. The emitter 611 is positioned transversely, for example, the emitter 611 is positioned rightwards along a direction illustrated in the figures, and a light-emitting surface of the emitter 611 faces a right side.

The first light-guiding component 62 is located between the emitter 611 and the camera 63 and configured to lead the probe light into the camera 63. The light-emitting surface of the emitter 611 faces towards a light-entering surface of the first light-guiding component 62. A light-emitting surface of the first light-guiding component 62 is parallel with a light-emitting surface of the camera 63. The light-emitting surface of the first light-guiding component 62 is located below the camera 63. In an embodiment, the first light-guiding component 62 is located below the camera 63.

The camera 63 includes a lens 631 and a base 632, a first end of the base 632 is connected to the circuit board 30, and a second end of the base 632 is configured to connect the lens 631. In an embodiment, a right side wall of the lens 631 is connected to an upper end of the base 632, and a lower end of the base 632 is connected to the circuit board 30. In an embodiment, a left side wall of the lens 631 is connected to the upper end of the base 632, and the lower end of the base 632 is connected to the circuit board 30.

In an embodiment, the first light-guiding component 62 is a triangular prism. A light-emitting surface of the triangular prism is located below the lens 631. A section of the triangular prism is in a triangular shape, such as a right triangle. One right-angle side faces a direction of the emitter 611, and the other right-angle side faces towards a direction of the lens 631 of the camera 63. In an embodiment, the right-angle side of the triangular prism facing the camera 63 is spaced apart from the lens 631 of the camera 63.

Figure 5:
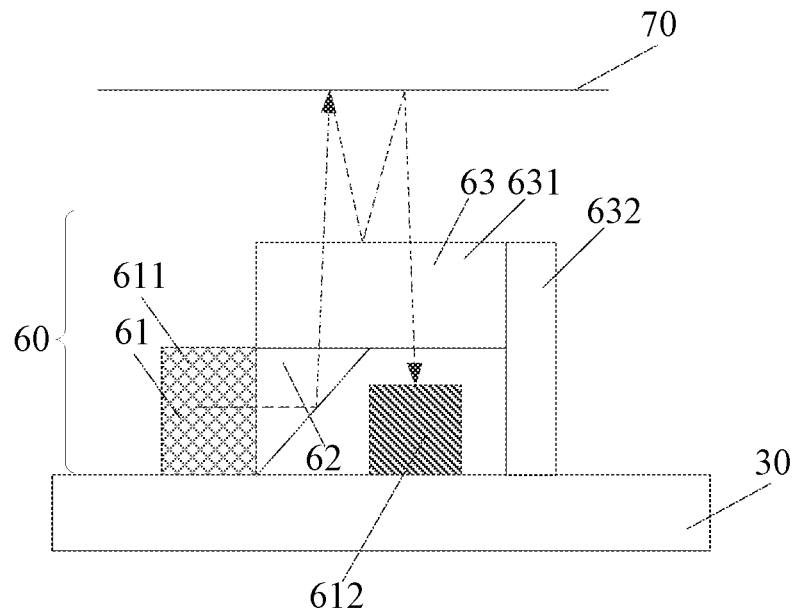
FIG. 5 is a second schematic view of a functional assembly provided in embodiments of the present disclosure.

As illustrated in FIG. 5, in an embodiment, the right-angle side of the triangular prism facing the camera 63 abuts against the lens of the camera 63. For example, an upper right-angle side of the triangular prism abuts against a lower end face of the lens 631. In a specific using process, the triangular prism transmits the probe light emitted by the emitter 611 to the lens 631 of the camera 63, and transmits the probe light to the outside through the lens 631 of the camera 63. In an embodiment, the triangular prism transmits an infrared ray emitted by the emitter 611 to the camera 63 and transmits the infrared ray to the outside through the camera 63, so that an emitting hole in the cover plate is omitted.

As illustrated in FIG. 4 or FIG. 5, a light-entering surface (i.e. a light-receiving surface) of the receiver 612 faces a light-entering surface of the lens 631, and the receiver 612 is located below the lens 631. The receiver 612 is positioned longitudinally and configured to receive a detection light through the camera 63. The detection light is formed by reflection of the probe light against an obstacle. In an embodiment, the receiver 612 and the lens 631 are spaced apart.

Figure 6:
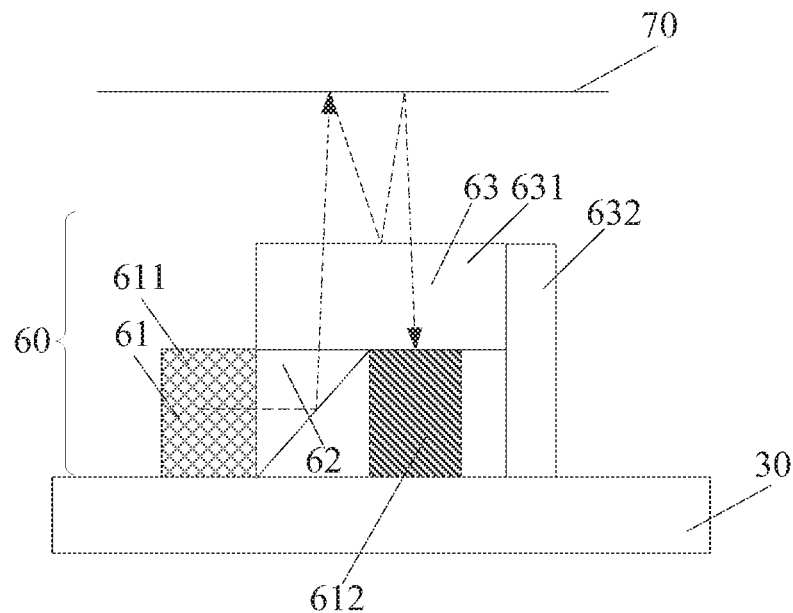
FIG. 6 is a third schematic view of a functional assembly provided in embodiments of the present disclosure.

In an embodiment, as illustrated in FIG. 6, the receiver 612 abuts against the lower end face of the lens 631 so as to connect the lens better. When there is the obstacle 70 above the screen, the probe light is reflected by the obstacle 70 to forms the detection light, and the probe light is transmitted to the receiver 612 after passing through the lens 631, so that a receiving hole in the cover plate is omitted. A transmitting direction of the probe light is as illustrated by an arrow in the figure.

In an embodiment, the receiver 612 and the emitter 611 are spaced apart, and a space between the receiver 612 and the emitter 611 is between 6 mm and 14 mm.

Figure 7:
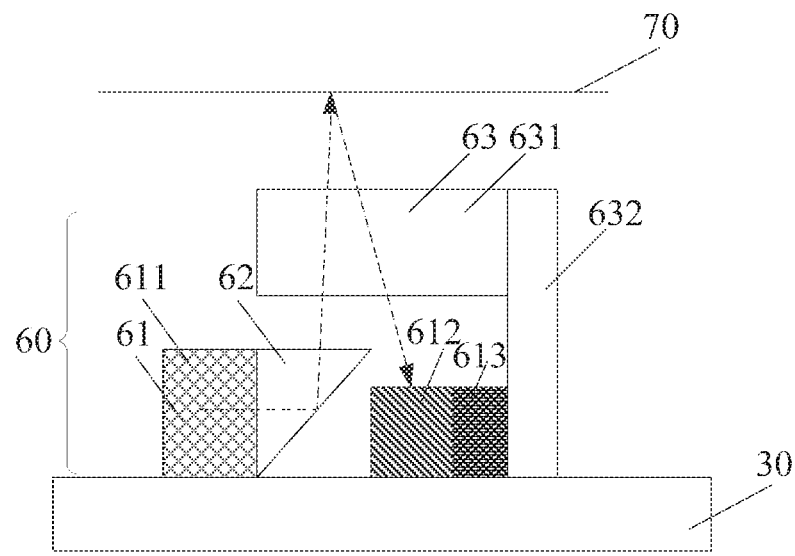
FIG. 7 is a fourth schematic view of a functional assembly provided in embodiments of the present disclosure.

In an embodiment, as illustrated in FIG. 7, the sensor unit 61 further includes an ambient light sensor 613. The ambient light sensor 613 and the receiver 612 are provided adjacent to each other, and the ambient light sensor 613 is also located below the lens 631. Ambient light enters the ambient light sensor 613 after passing through the lens 631.

Figure 8:
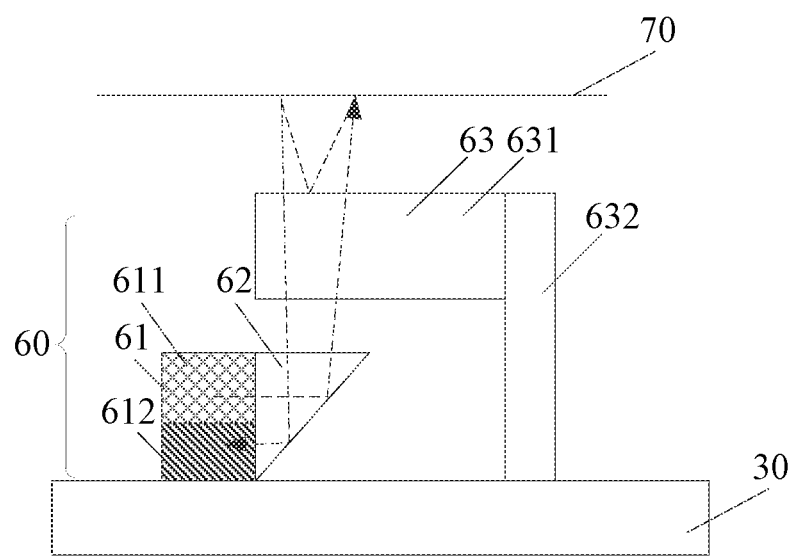
FIG. 8 is a fifth schematic view of a functional assembly provided in embodiments of the present disclosure.
Figure 9:
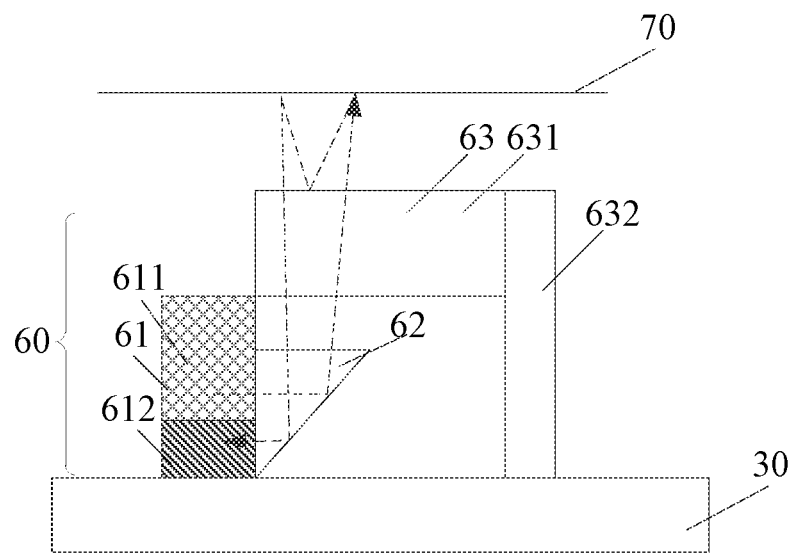
FIG. 9 is a sixth schematic view of a functional assembly provided in embodiments of the present disclosure.

As illustrated in FIG. 8, in an embodiment, the sensor unit 61 is a two-in-one device. FIG. 8 differs from FIG. 4 in that the receiver 612 is also positioned transversely, and the receiver 612 and the emitter 611 are juxtaposed along a longitudinal direction and are located at the same side of the first light-guiding component 62. In an embodiment, the receiver 612 is located below the emitter 611. In an embodiment, as illustrated in FIG. 9, a top of the emitter 611 abuts against the lower end face of the lens 631. It could be understood that the receiver 612 can also be located above the emitter 611. In an embodiment, a top of the receiver 612 abuts against the lower end face of the lens 631.

The first light-guiding component 62 is further configured to lead the probe light entering the camera 63 into the receiver 612. The first light-guiding component 62 is located among the receiver 612, the emitter 611 and the camera 63, the light-emitting surface of the first light-guiding component 62 is parallel with the light-emitting surface of the camera 63, and the light-emitting surface of the emitter 611 and the light-entering surface of the receiver 612 both face the light-entering surface of the first light-guiding component 62. The light-emitting surface of the emitter 611 and the light-entering surface of the receiver 612 both face the right side, i.e. both being located at a left side of the first light-guiding component 62, and a top of the first light-guiding component 62 faces a bottom of the lens 631 of the camera 63.

In an actual using process, when there is the obstacle 70 above the screen, the probe light is reflected by the obstacle 70 to forms the detection light, and the detection light is reversely transmitted to the first light-guiding component 62 after passing through the lens 631, and then is transmitted to the receiver 612 through the first light-guiding component 62.

Figure 10:
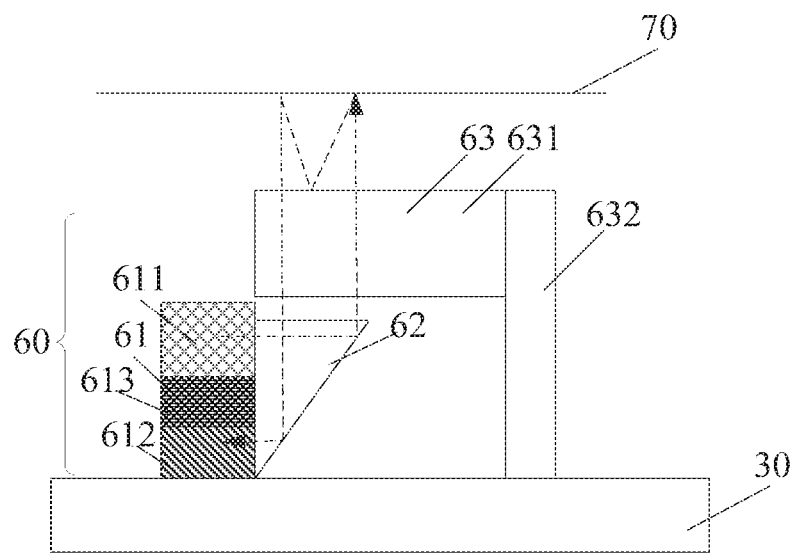
FIG. 10 is a seventh schematic view of a functional assembly provided in embodiments of the present disclosure.

As illustrated in FIG. 10, in an embodiment, the sensor unit 61 further includes the ambient light sensor 613. The ambient light sensor 613 is juxtaposed with the receiver 612 and the emitter 611, and the ambient light sensor 613 is also located at the left side of the first light-guiding component 62. The ambient light enters the first light-guiding component 62 after passing through the lens 631, and then the first light-guiding component 62 transmits the ambient light to the ambient light sensor 613.

Figure 11:
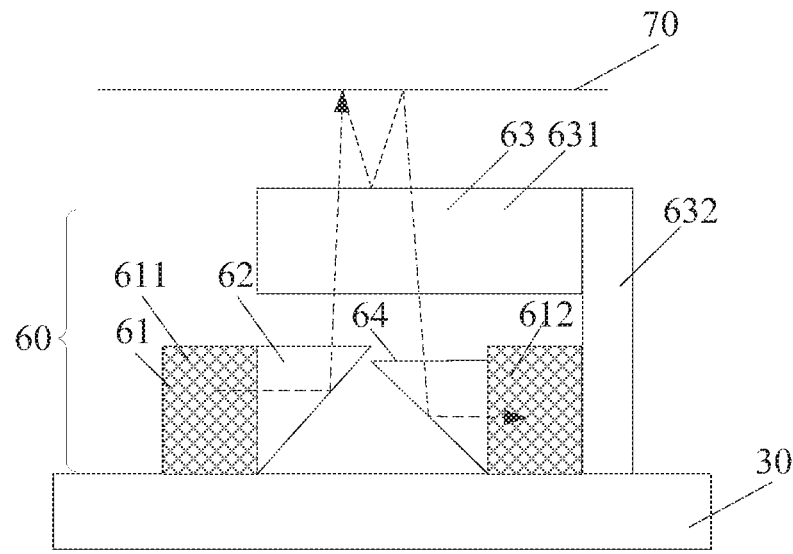
FIG. 11 is an eighth schematic view of a functional assembly provided in embodiments of the present disclosure.

As illustrated in FIG. 11, in an embodiment, FIG. 11 differs from FIG. 4 in that the functional assembly 60 further includes a second light-guiding component 64, and the second light-guiding component 64 is configured to lead the detection light entering the camera 63 into the receiver 612. The second light-guiding component 64 and the receiver 612 are juxtaposed, and the second light-guiding component 64 is also located below the lens 631.

The second light-guiding component 64 is located between the receiver 612 and the camera 63, the light-entering surface of the receiver 612 faces a light-emitting surface of the second light-guiding component 64, and a light-entering surface of the second light-guiding component 64 is parallel with the light-emitting surface of the camera 63. The light-entering surface of the second light-guiding component 64 is located below the camera 63. The light-emitting surface of the camera 63 is parallel with the light-entering surface of the camera 63.

In an actual using process, when there is the obstacle 70 above the screen, the probe light is reflected by the obstacle 70 to forms the detection light, and the detection light is reversely transmitted to the second light-guiding component 64 after passing through the lens 631, and then is transmitted to the receiver 612 through the second light-guiding component 64.

In an embodiment, the second light-guiding component 64 is a triangular prism. A section of the triangular prism is in a triangular shape, such as a right triangle. One right-angle side faces a direction of the receiver 612, and the other right-angle side faces a direction of the lens 631 of the camera 63. In a specific using process, the triangular prism transmits the detection light entering the lens 631 to the receiver 612. In an embodiment, the triangular prism transmits an infrared ray entering the lens 631 to the receiver 612.

Figure 12:
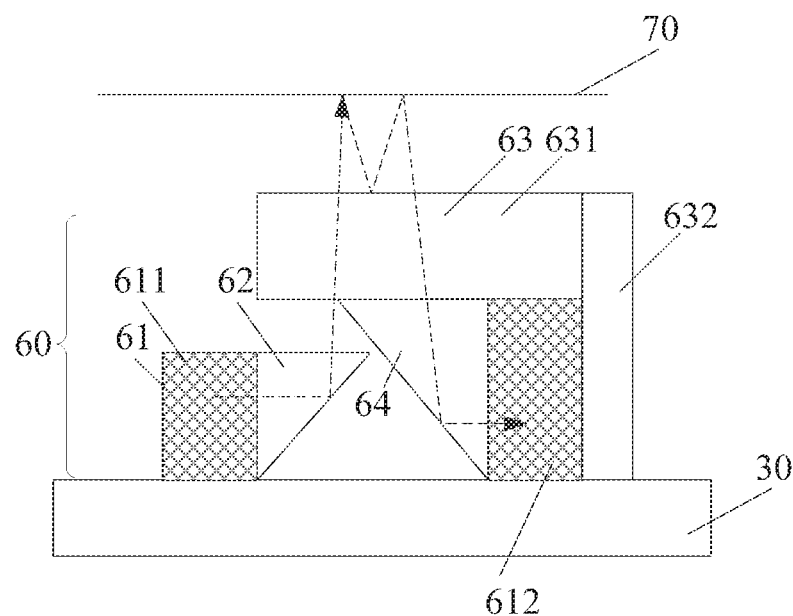
FIG. 12 is a ninth schematic view of a functional assembly provided in embodiments of the present disclosure.

As illustrated in FIG. 12, in an embodiment, a top of the second light-guiding component 64 abuts against the lower end face of the lens 631 of the camera 63, and the top of the receiver 612 also abuts against the lower end face of the lens 631. It could be understood that the top of the first light-guiding component 62 abuts against the lower end face of the lens 631 of the camera 63, and the top of the emitter 611 also abuts against the lower end face of the lens 631.

The present disclosure further provides a display device, which includes the above-mentioned display screen 20 and the above-mentioned functional assembly 60. The display screen 20 includes the functional area 23, and the camera 63 is provided in the functional area 23. In an embodiment, the functional area 23 is a hole, and the camera 63 is provided in the hole.

In an embodiment, the sensor unit 61 and the functional area 23 are positioned in a staggered manner, and the probe light emitted by the emitter 611 is transmitted to the functional area 23 through the first light-guiding component 62 and then emitted.

In summary, in the functional assembly, the display device and the terminal provided in embodiments of the present disclosure, the camera doubles as a functional hole, so that the size of the functional area is reduced, i.e. an area of the non-display region is reduced, an area of the display region is effectively enlarged, and hence the effect of large-screen display is realized.

To promote understanding of one or more exemplary embodiments, reference has been made to the exemplary embodiments illustrated in the drawings, and specific language has been used to describe these embodiments. However, no limitation of the scope of the inventive concept is intended by this specific language, and exemplary embodiments should be construed to encompass all exemplary embodiments generally known to one of ordinary skill in the art.

The words "mechanism," "element," "means," and "configuration" are used broadly and are not limited to mechanical or physical embodiments, but can include software routines in conjunction with processors, etc.

The particular implementations shown and described herein are illustrative examples of the disclosure and are not intended to otherwise limit the scope of the disclosure in any way. For the sake of brevity, conventional electronics, control systems, software development and other functional aspects of the systems (and components of the individual operating components of the systems) cannot be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections can be present in a practical device. Moreover, no item or component is essential to the practice of the disclosure unless the element is specifically described as "essential" or "critical". The words used herein "including" "having" or the like are meant to be inclusive in terms of technology.

The use of the terms "a" and "an" and "the" and similar referents in the context of describing the inventive concept (especially in the context of the following claims) are construed to cover both the singular form and the plural form. Furthermore, ranges of values recited herein are merely intended to refer to each of separate values falling within the range in a shorthand method, unless otherwise indicated herein, and each separate value is incorporated into the specification as if it were individually recited herein. Also, the steps of all methods described herein can be performed in any suitable order unless otherwise indicated herein or otherwise clearly contradicting the context. The inventive concept is not limited to the described order of the steps. The use of any and all examples, or exemplary language (e.g., "such as") provided herein, is intended merely to better illuminate the inventive concept and does not pose a limitation on the scope of the inventive concept unless otherwise claimed. Numerous modifications and adaptations will be readily apparent to one of ordinary skill in the art without departing from the spirit and scope.

It should be understood that exemplary embodiments described herein should only be considered in a descriptive sense and not be used for purposes of limitation. Descriptions of features or aspects within each exemplary embodiment should typically be considered as available for other similar features or aspects in other exemplary embodiments. Although the present disclosure has been described with an exemplary embodiment, various changes and modifications can be suggested to one skilled in the art. It is intended that the present disclosure encompass such changes and modifications as fall within the scope of the appended claims.

What is claimed is:

1. A functional assembly, comprising: a sensor unit, a light-guiding component and a camera comprising a lens, the sensor unit comprising an emitter and a receiver; the emitter being configured to emit probe light; the light-guiding component being configured to introduce the probe light and transmit the probe light to the outside through the lens of the camera; the receiver being configured to receive detection light through the lens of the camera, the detection light being formed by reflection of the probe light, the light-guiding component being located between the sensor unit and the lens of the camera, and the emitter and the receiver being overlapped in a direction perpendicular to a light-emitting surface of the camera.

2. The functional assembly according to claim 1, wherein the light-guiding component is further configured to lead the probe light entering the lens of the camera into the receiver.

3. The functional assembly according to claim 2, wherein a light-emitting surface of the light-guiding component is parallel with the light-emitting surface of the camera, and a light-emitting surface of the emitter and a light-entering surface of the receiver both face a light-entering surface of the light-guiding component.

4. The functional assembly according to claim 1, wherein the sensor unit further comprises an ambient light sensor.

5. The functional assembly according to claim 1, wherein the light-guiding component is a triangular prism.

6. The functional assembly according to claim 5, wherein a section of the triangular prism is in a right triangle, one right-angle side faces a direction of the emitter, and the other right-angle side faces towards a direction of a lens of the camera.

7. A display device, comprising a display screen and a functional assembly, the display screen comprising a functional area, a camera comprising a lens and being provided in the functional area, and the functional assembly comprising:
a sensor unit, a light-guiding component and the camera, the sensor unit comprising an emitter and a receiver; the emitter being configured to emit probe light; the light-guiding component being configured to introduce the probe light and transmit the probe light to the outside through the lens of the camera; the receiver being configured to receive detection light through the lens of the camera, the detection light being formed by reflection of the probe light, the light-guiding component being located between the sensor unit and the lens of the camera, and the emitter and the receiver being overlapped in a direction perpendicular to a light-emitting surface of the camera.

8. The display device according to claim 7, wherein the functional area is a hole, and the camera is provided in the hole.

9. The display device according to claim 7, wherein the sensor unit and the functional area are positioned in a staggered manner, and the probe light emitted by the emitter is transmitted to the functional area through the first light-guiding component and is emitted.

10. A terminal, comprising a circuit board, a functional assembly and a casing, the circuit board being mounted in the casing, the functional assembly being connected to the circuit board, the functional assembly comprising:
a sensor unit, a light-guiding component and a camera comprising a lens, the sensor unit comprising an emitter and a receiver; the emitter being configured to emit probe light; the light-guiding component being configured to introduce the probe light and transmit the probe light to the outside through the lens of the camera; the receiver being configured to receive detection light through the lens of the camera, the detection light being formed by reflection of the probe light, the light-guiding component being located between the sensor unit and the lens of the camera, and the emitter and the receiver being overlapped in a direction perpendicular to a light-emitting surface of the camera.

11. The functional assembly according to claim 1, wherein the receiver is located below the emitter.

12. The functional assembly according to claim 11, wherein a top of the emitter abuts against a lower end face of the lens.

13. The functional assembly according to claim 1, wherein the emitter is located below the receiver.

14. The functional assembly according to claim 13, wherein a top of the receiver abuts against a lower end face of the lens.

15. The functional assembly according to claim 4, wherein the ambient light sensor is juxtaposed with the receiver and the emitter.

16. The display device according to claim 7, wherein the light-guiding component is further configured to lead the probe light entering the lens of the camera into the receiver.

17. The display device according to claim 16, wherein a light-emitting surface of the light-guiding component is parallel with the light-emitting surface of the camera, and a light-emitting surface of the emitter and a light-entering surface of the receiver both face a light-entering surface of the light-guiding component.

18. The terminal according to claim 11, wherein the camera further comprises a base, a side wall of the lens is connected to a first end of the base, and a second end of the base is connected to the circuit board.

19. The terminal according to claim 10, wherein the light-guiding component is further configured to lead the probe light entering the lens of the camera into the receiver.

20. The terminal according to claim 19, wherein a light-emitting surface of the light-guiding component is parallel with the light-emitting surface of the camera, and a light-emitting surface of the emitter and a light-entering surface of the receiver both face a light-entering surface of the light-guiding component.

* * * * *